Feb. 24, 1959 J. G. SPRACKLEN 2,875,331

SWITCHING TUBE CIRCUIT WITH AUXILIARY LOAD ENERGIZED BY SELF-BIAS DEVELOPED AT GATING GRID

Filed Nov. 17, 1952 3 Sheets-Sheet 1

JOHN G. SPRACKLEN
*INVENTOR.*

BY Francis W. Crotty

HIS ATTORNEY.

JOHN G. SPRACKLEN
*INVENTOR.*
BY Francis W. Crotty
HIS ATTORNEY.

JOHN G. SPRACKLEN
INVENTOR.
BY Francis W. Crotty
HIS ATTORNEY

United States Patent Office 2,875,331
Patented Feb. 24, 1959

2,875,331

SWITCHING TUBE CIRCUIT WITH AUXILIARY LOAD ENERGIZED BY SELF-BIAS DEVELOPED AT GATING GRID

John G. Spracklen, Chicago, Ill., assignor to Zenith Radio Corporation, a corporation of Delaware Application November 17, 1952, Serial No. 320,866
2 Claims. (Cl. 250—27)

This invention relates to television receivers and more particularly to synchronizing and automatic gain control systems for use in such receivers.

In United States Patent No. 2,606,300, issued August 5, 1952, for "Electron-Discharge Device" and in the copending application of Robert Adler, Serial No. 267,826, filed January 23, 1952, now Patent No. 2,684,404, issued July 20, 1954, for "Frequency Controllable Oscillating Systems," both assigned to the present assignee, there are disclosed and claimed a novel electron-discharge device and system for use as a synchronizing-control arrangement in a television receiver or the like. In the preferred embodiment, a two-section tube is employed, the first or control section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the second or power section of the tube, an electron beam is simultaneously subjected to a sinusoidal magnetic-deflection field energized from the line-frequency sweep output and to a slow lateral displacement in accordance with the balanced unidirectional control voltage developed between the two phase-detector anodes in the first section. In this manner, the duty cycles of two final anodes in the second section of the tube are caused to vary in accordance with the unidirectional control potential developed between the phase-detector anodes of the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control (AFC) phase-detector, line-frequency oscillator, and reactance tube, providing a substantial saving in comparison with conventional systems which usually employ three or more tubes to perform these functions.

In the copending applications of Robert Adler, Serial No. 242,509, filed August 18, 1951, now Patent No. 2,717,972, issued September 13, 1955, entitled "Electron-Discharge Device," and Serial No. 314,373, filed October 11, 1952, now Patent No. 2,814,801, issued November 26, 1957 entitled "Television Receiver Sync Separator and Noise-Gated Automatic Gain Control System," and both assigned to the present assignee, there are disclosed and claimed a novel tube and system for obtaining both noise-immune synchronizing-signal separation and automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output current pulses corresponding to the synchronizing-pulse components of the applied composite video signals, and these output pulses drive the line-frequency and field-frequency scanning systems. The other plate electrode is utilized to develop an automatic-gain-control (AGC) potential which is then applied in a conventional manner to one or more of the early receiving stages. In order to insure the establishment of synchronizing-pulse output at the first plate electrode whenever the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all normal receiver-input signal levels, with the result that incorrect synchronizing-pulse clipping which might otherwise be caused by drift or misadjustment of the automatic gain control circuits is effectively precluded. Further noise immunity may be provided, if desired, by applying a gating signal to the AGC output plate, although it is preferred to employ continuous energization of the AGC plate in the manner disclosed and claimed in the copending application of John G. Spracklen, Serial No. 281,708, filed April 12, 1952, now abandoned, for "Television Receiver" and also assigned to the present assignee, since adequate noise immunity is obtained in this manner without the added complexity introduced by time gating.

In the copending application of John G. Spracklen, Serial No. 246,768, filed September 15, 1951, now Patent No. 2,768,319, issued October 23, 1956, for "Electron-Discharge Device," and assigned to the present assignee, there are disclosed and claimed a still further novel tube and system for combining certain features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last-mentioned Adler tube is replaced by at least a pair of phase-detector plate electrodes symmetrically positioned behind the sync clipping aperture. A balanced comparison signal is applied between the two phase-detector plates from the line-frequency scanning system of the receiver. When the desired condition of phase synchronism exists, the phase-detector plates are maintained at equal average potentials; however, upon deviation from synchronism, a balanced control potential indicative of the magnitude and direction of the deviation is developed. In accordance with a preferred embodiment, this system is employed in conjunction with a deflection-tube oscillator, and the phase-detector plate electrodes are direct-coupled to the deflection electrodes of the oscillator to effect automatic frequency control.

While the tubes and systems described and claimed in the aforementioned copending applications are operative and afford numerous advantages over conventional synchronizing and automatic gain control systems, it has been found that certain difficulties of a practical nature may be encountered. When continuous energization of the AGC plate is employed in the manner described in application Serial No. 281,708, it is necessary to provide a source of unidirectional negative bias potential in order to translate the AGC potential to an average level suitable for application to the control grids of the R. F. and I. F. amplifier stages and to provide a suitable amplitude delay characteristic. The use of a battery to provide this negative bias voltage is undesirable because of the necessity of replacement at periodic intervals. It is possible to employ a diode rectifier for this purpose, although this solution is uneconomical and requires an additional tube.

Moreover, it has been found that the deflectors in the power section of the tube may draw beam current during the portions of each operating cycle when the beam is subjected to its maximum lateral deflection in each direction; since these deflectors are direct-coupled to the phase-detector anodes in the control section of the tube, the average phase-detector anode voltage may fall, leading to instability or collapse of the automatic frequency control action.

It is therefore an important object of the present invention to provide a new and improved synchronizing system for use in a television receiver, of the type disclosed and claimed in the above-identified Adler and/or Spracklen patents and applications.

It is a more specific object of the invention to provide such a new and improved system in which the requirement of a battery or an extra diode for providing a negative bias voltage for the automatic gain control system is obviated.

In accordance with the present invention, these and other objects are accomplished by applying a gating signal to an intensity-control electrode, preferably a focusing electrode, in the power section of the tube to permit the flow of space current to the output electrode system at a predetermined time. The same intensity-control electrode serves as a diode plate for developing a unidirectional negative bias voltage for application to the automatic gain control system, thus eliminating the necessity for providing a battery or an additional diode.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is employed to denote the varying unidirectional or unipolar signal after detection. The term "direct-coupling" is descriptive of a circuit coupling capable of transmitting direct or unidirectional voltages, and a "direct connection" is a direct-coupling of substantially zero impedance.

Figure 1:
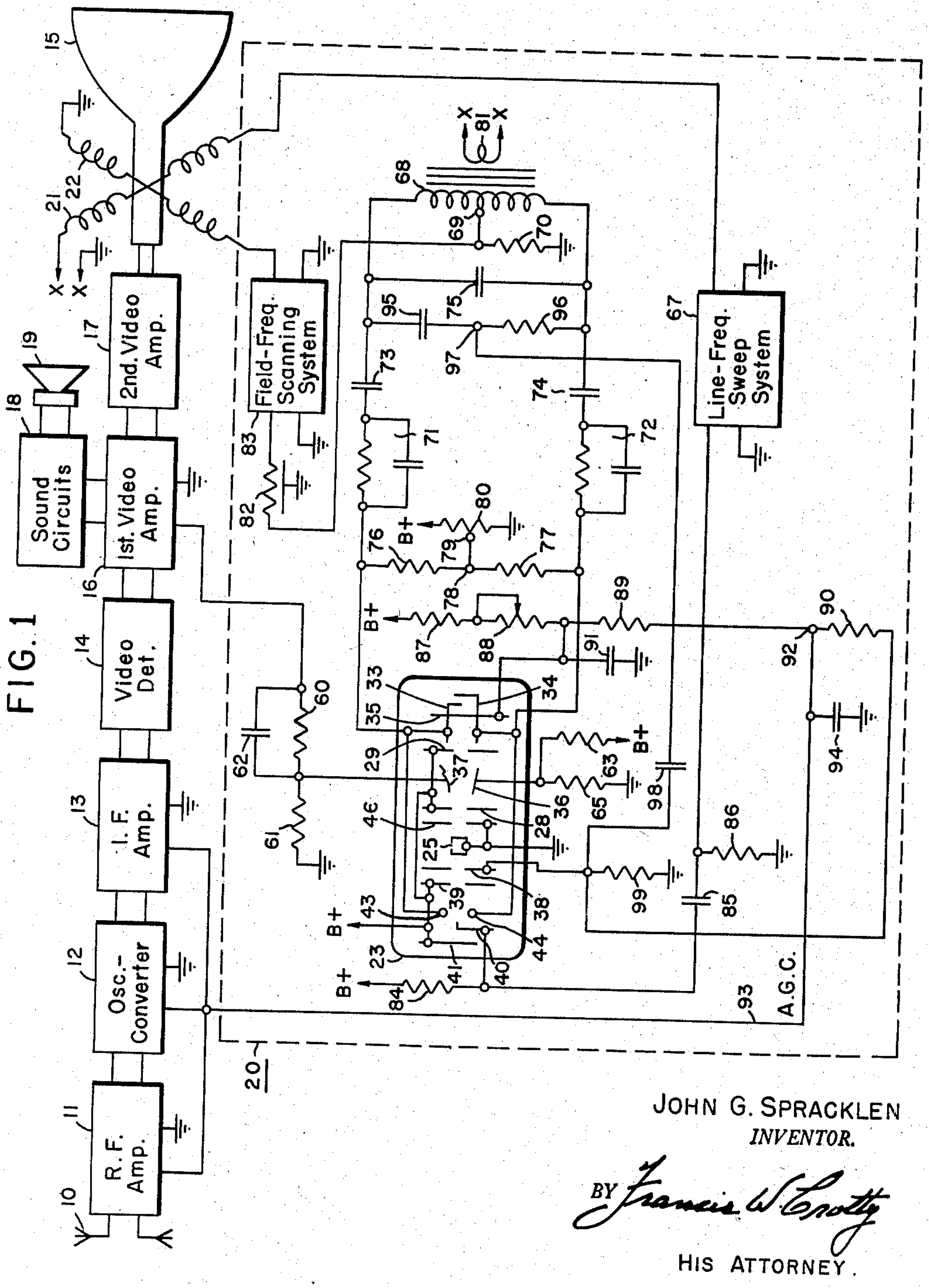
Figure 1 is a schematic diagram of a television receiver embodying the present invention.

In the television receiver of Figure 1, incoming composite television signals are received by an antenna 10 and impressed on a radio-frequency amplifier 11. The amplified composite television signals from radio-frequency amplifier 11 are supplied to an oscillator-converter 12, and the intermediate-frequency output signals from oscillator-converter 12 are impressed on an intermediate-frequency amplifier 13. The amplified intermediate-frequency composite television signals are demodulated by a video detector 14, and the video-signal components of the resulting composite video signals are impressed on the input circuit of an image-reproducing device 15, such as a cathode-ray tube, after amplification by first and second video amplifiers 16 and 17. Intercarrier sound signals developed in the output circuit of first video amplifier 16 are applied to suitable sound circuits 18, which may comprise a limiter-discriminator and audio and power amplifier stages, and the amplified audio signals are impressed on a loudspeaker 19 or other sound-reproducing device.

Composite video signals from first video amplifier 16 are supplied to a synchronizing and automatic gain control system 20 embodying the present invention, and suitable line-frequency and field-frequency scanning signals are impressed on appropriate line-frequency and field-frequency deflection coils 21 and 22 associated with image-reproducing device 15.

The basic construction and operation of synchronizing and automatic gain control system 20 are specifically described in the Spracklen application Serial No. 246,768, now Patent No. 2,768,319. This system is built around a special purpose electron tube 23 of novel construction which combines the several functions of noise-immune synchronizing-signal separation, automatic-frequency-control phase-detection, generation of line-frequency oscillations, frequency control of the line-frequency oscillations, and automatic gain control generation. To facilitate the following description of the construction and operation of the receiver of Figure 1, reference is now made to Figures 2–5.

Figure 2:
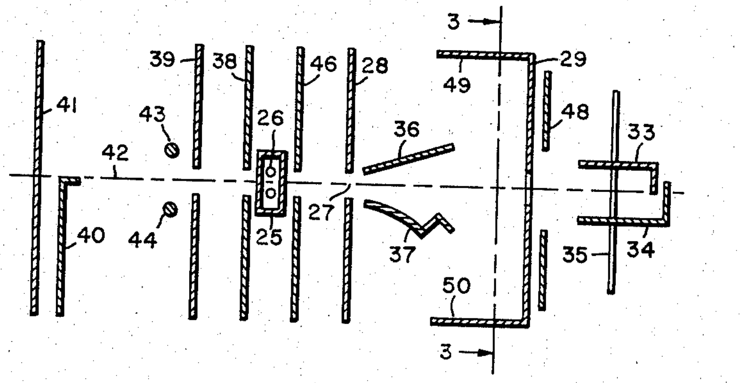
Figure 2 is a cross-sectional view of the electrode system of an electron-discharge device employed in the receiver of Figure 1.

In Figure 2, which is a cross-sectional view of special purpose electron tube 23, two separate sheet-like electron beams of substantially rectangular cross-section are projected from opposite electron-emissive surfaces of a common elongated cathode 25 which is provided with an indirect heater element 26. In the right-hand or control section of the tube, space electrons originating at cathode 25 are projected through a slot 27 in an accelerating electrode 28 toward a target electrode or intercepting anode 29 which is provided with a pair of rectangular apertures or slots 30 and 31, best visualized from the view of Figure 3. Preferably, slots 30 and 31 are arranged in overlapping alignment in a direction parallel to cathode 25, and slot 31 may be provided with a lateral extension 32 for a purpose to be hereinafter described. A pair of receptor electrodes 33 and 34, constituting a first output electrode system, are provided for collectively receiving space electrons which pass through slot 30, and an additional plate electrode 35, constituting a second output electrode system, is provided for receiving space electrons which pass through slot 31. Receptor electrodes 33 and 34 are preferably constructed as "controllector" electrodes each having a deflection-control portion and a collector portion and adapted to be biased at equal positive operating voltages in the manner described and claimed in the copending application of Robert Adler, Serial No. 263,737, filed December 28, 1951, now Patent No. 2,744,721, issued April 10, 1956, for "Electron-Discharge Device," and assigned to the present assignee. However, output electrodes 33 and 34 may be formed in any other desired manner, for example as a pair of simple transverse collecting plates such as those described in the Spracklen application Serial No. 246,768, now Patent No. 2,768,319, without departing from the spirit of the present invention.

A deflection-control system, illustrated as a pair of electrostatic-deflection electrodes or plates 36 and 37, is provided between accelerating electrodes 28 and target electrode 29. Deflectors 36 and 37 extend for the full height of the beam to constitute a single input electrode system associated with both output electrode systems. At least the active deflector 37 is preferably of louvered construction as shown in Figure 2 and described and claimed in the copending application of Robert Adler, Serial No. 277,399, filed March 19, 1952, now Patent No. 2,691,117, issued October 5, 1954, for "Electron-Discharge Device," and assigned to the present assignee, in order to minimize the amount of beam current drawn by the active deflector under strong impulse noise conditions. The passive or companion deflector 36 may also advantageously be constructed in the same manner (not shown) to avoid deleterious effects of secondary electron emission resulting from impingement of space electrons under certain operating conditions. Preferably the tube is so constructed and operated that the thickness of the beam at the plane of target elctrode 29 is less than the width of slot 30.

In the left-hand or power section of the tube, electrons originating at cathode 25 are projected through slotted focusing and accelerating electrodes 38 and 39 toward an output system comprising a pair of anodes 40 and 41 respectively having active portions on opposite sides of the tube axis or undeflected path 42 of this second beam. A pair of electrostatic-deflection electrodes 43 and 44 are provided between slot 38 and anodes 40 and 41. A focusing electrode 46, having a slot narrower than the emissive surface of cathode 25, may be interposed between cathode 25 and accelerating electrode 28 and maintained at or near cathode potential to restrict electron emission in the control section of the tube to a narrow central portion of the emissive surface.

Those elements thus far described constitute the essential elements of a special purpose electron tube suitable for use in the synchronizing and AGC system 20 of the receiver of Figure 1. However, refinements of this electrode system may be made in accordance with well known practices in the art. Thus, it may be advantageous to include one or more suppressor electrodes, such as electrode 48, between intercepting anode 29 and electrodes 33, 34 and 35, and to form target electrode 29 with flanges 49 and 50 directed toward the electron gun comprising cathode 25 and accelerating electrode 28, for the purpose of avoiding spurious effects attributable to secondary electron emission. Further, the particular construction of deflection-control systems 36, 37 and 43, 44 may be varied; for example, one or more of the deflection electrodes may be replaced by plural electrodes biased at different potentials, such as cathode potential and the D. C. supply voltage of the associated apparatus with which the tube is employed. Preferably, however, deflection electrodes 43 and 44 in the left-hand section of the tube are constructed as simple parallel rods or wires to minimize the intercepting area presented to stray electrons. Still further, either or both of the sheet-like electron beams may be split into two or more beams subjected to a common transverse deflection field or to synchronous deflection fields without departing from the spirit of the invention.

The electrode system is mounted within a suitable envelope (not shown) which may then be evacuated and gettered in accordance with well known procedures in the art. The entire structure may conveniently be included in a miniature glass envelope, a number of the electrode connections being made internally of the envelope in a manner to be made apparent, for the purpose of minimizing the number of external circuit connections.

In operation, deflection plates 36 and 37 are biased to direct the electron beam in the right-hand section of the tube to an electron-impervious portion of target electrode 29, for example, to a solid portion of electrode 29 on the side of aperture 30 nearer deflection plate 36. When an input signal of positive polarity is applied to deflection plate 37, or alternatively when an input signal of negative polarity is applied to deflection plate 36, the beam is deflected at least partially into slots 30 and 31 whenever the input signal exceeds a predetermined amplitude level. During such intervals, current is permitted to flow in the output circuits associated with electrodes 33, 34 and 35, provided these electrodes are maintained at a proper potential to receive electrons, while during other intervals no such current flow can occur. Moreover, when the input signal exceeds a predetermined higher amplitude, the beam is deflected beyond slot 30 of intercepting electrode 29, and current flow to output electrodes 33 and 34 is again interrupted. At still greater input-signal amplitudes, the current flowing to output electrode 35 is first diminished as the beam is deflected into extension 32 of slot 31 and then extinguished as the beam sweeps beyond extension 32.

Figure 4:
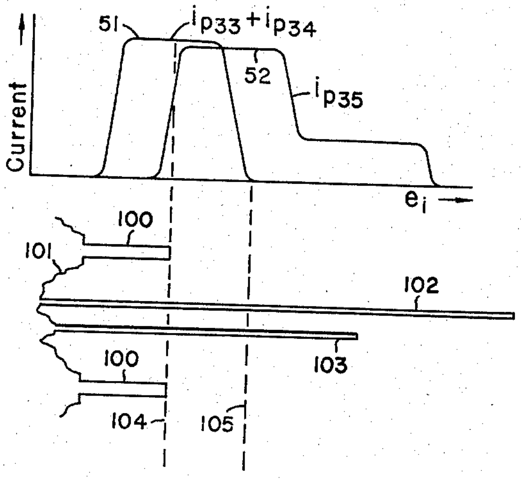
Figures 4–6 are graphical representations useful in understanding the operation of the present invention.
Figure 5:
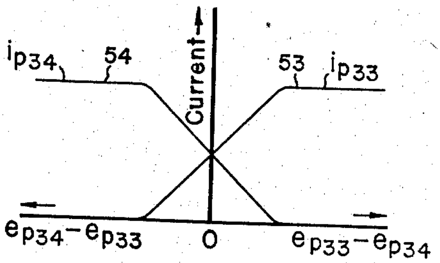

The transfer characteristics of the input deflection-control system 36, 37 with respect to the output system comprising electrodes 33 and 34 and with respect to output electrode 35 are represented by curves 51 and 52 respectively of Figure 4. Curve 51 represents the total current ($i_{p33}+i_{p34}$) flowing to controllector electrodes 33 and 34 as a function of the input voltage $e_i$ applied to deflection-control system 36, 37. Curve 52 shows the current $i_{p35}$ to output electrode 35 as a function of the input voltage $e_i$. The magnitudes and shapes of curves 51 and 52 are determined by the geometry of slots 30 and 31; the particular operating characteristics illustrated in Figure 4 are those obtained for a specific embodiment and are not intended to be construed as representing required relative or absolute magnitudes or shapes.

Receptor electrodes 33 and 34, which each comprise electrically connected control and collector portions and are therefore termed "controllector" electrodes, are disposed in effectively symmetrical relation with respect to the tube axis 42 passing through the center of slot 30 and, in operation, are preferably biased to equal positive unidirectional operating potentials. The collector portions conjointly define a collector system for collectively receiving substantially all electrons projected through slot 30, and the control portions serve as a deflection-control system responsive to applied signals for controlling the space current distribution between the collector portions. The control characteristics of controllector electrodes 33 and 34 are shown qualitatively in Figure 5, in which curve 53 represents the current $i_{p33}$ to electrode 33 and curve 54 the current $i_{p34}$ to electrode 34 as functions of the potential difference $e_{p33}-e_{p34}$ between the two controllector electrodes. As described in Adler application Serial No. 263,737, now Patent No. 2,741,721, it has been found that the current distribution between controllector electrodes 33 and 34 may be made substantially independent of the position at which the beam enters slot 30 of target electrode 29. This desirable condition may be obtained over a broad range of positive bias potentials for controllector electrodes 33 and 34, as for example between one-fifth and one-third of the voltage applied to target electrode 29. When so operated, target electrode 29 and controllector electrodes 33 and 34 form an electrostatic lens for focusing the beam, whenever it passes through slot 30, to converge on the collector system at a location substantially independent of the input signal applied between deflection-control electrodes 36 and 37. Thus, in practice, it has been found that the operating characteristics of Figure 5 remain substantially unchanged throughout a fairly large range of positive bias potentials for controllector electrodes 33 and 34. Curves 53 and 54 intersect symmetrically, for an effectively symmetrical physical construction, and the current is divided equally between electrodes 33 and 34 when their potentials are equal. Secondary electrons originating at controllector electrodes 33 and 34 are effectively trapped in the enclosed region between these electrodes.

The left-hand portion of the structure of Figure 2 constitutes a conventional deflection-control electrode system. The electron beam projected through focusing and accelerating electrodes 38 and 39 is directed either to anode 40 or to anode 41 in accordance with the instantaneous potential difference between electrostatic-deflection electrodes 43 and 44. If a sinusoidal signal wave is applied between deflection electrodes 43 and 44, the beam is caused cyclically to sweep back and forth transversely across axis 42 and is thereby switched back and forth between anodes 40 and 41. Consequently, since full beam current is switched from one anode to the other in a relatively small fraction of a cycle, oppositely phased square-wave output signals are produced in load circuits respectively associated with anodes 40 and 41; in the preferred embodiment of the invention, only one square-wave output signal is required, and either anode 40 or anode 41 is employed to develop the output signal while the other is directly connected to accelerating electrode 39. It is preferred that anode 40 be employed as the output anode in order to avoid difficulties arising from secondary electron emission.

Electron-discharge device 23 of the receiver of Figure 1 is constructed in the manner shown and described in connection with Figures 2–5. Composite video signals from first video amplifier 16 are supplied to deflection plate 37, hereinafter termed the active deflector, in the right-hand section of device 23 by means of a voltage-divider network comprising resistors 60 and 61, active deflector 37 being connected to the junction between resistors 60 and 61. A condenser 62 is connected in parallel with resistor 60. Cathode 25 of device 23 is connected to ground. Accelerating electrodes 28 and 39, target electrode 29, and second anode 41 are connected together (preferably internally of the envelope) and to a suitable source of positive unidirectional operating potential conventionally designated B+. Deflection plate 36, hereinafter termed the companion deflector, is connected to a tap on a voltage divider comprising resistors 63 and 65 connected between B+ and ground.

Synchronizing system 20 also comprises a line-frequency sweep system 67, which may include a discharge tube and a power output stage, for impressing suitable deflection currents on line-frequency deflection coil 21 associated with image-reproducing device 15. Controllector electrodes 33 and 34 of device 23 are respectively coupled to opposite terminals of a coil 68, having a center tape 69 which is returned to ground through a resistor 70, by means of anti-hunt networks comprising shunt-connected resistor-condenser combinations 71 and 72, and condensers 73 and 74. A tuning condenser 75 is connected in parallel with coil 68, and a conductive load impedance, such as a pair of equal resistors 76 and 77, is connected between electrodes 33 and 34, the junction 78 between resistors 76 and 77 being connected to a suitable positive bias potential source, as by connection to a tap 79 of a voltage divider 80 connected between B+ and ground. Coil 68 is energized by a feedback coil 81 which is preferably connected in series between line-frequency deflection coil 21 and ground, as indicated by the terminal designations X—X. Center tap 69 of coil 68 is also coupled through an integrator 82 to a field-frequency scanning system 83 which provides suitable deflection currents to field-frequency deflection coil 22 associated with image-reproducing device 15.

Controllector electrodes 33 and 34 are directly connected to electrostatic-deflection electrodes 43 and 44 respectively in the left-hand section of device 23, and anode 40 is connected to B+ through a load resistor 84 and to line-frequency sweep system 67 through a differentiating network comprising a series condenser 85 and a shunt resistor 86.

Plate electrode 35 is connected to B+ through a resistor 87 and a rheostat 88 and is also returned through series-connected resistors 89 and 90 to focusing electrode 38 which, in accordance with one feature of the invention, constitutes a suitable source of negative unidirectional operating potential in a manner to be hereinafter described; in operation, focusing electrode 38 may supply to resistor 90 a direct voltage of about 50 volts negative with respect to cathode 25. An integrating condenser 91 is connected between plate electrode 35 and ground. The junction 92 between resistors 89 and 90 is connected to the automatic gain control (AGC) lead 93 and is shunted by a filter condenser 94, and ABC lead 93 is connected to one or more of the receiving circuits comprising radio-frequency amplifier 11, oscillator-converter 12, and intermediate-frequency amplifier 13.

If desired, either the tube structure or the external circuitry, or both, may be modified to compensate for decentering of the reproduced image attributable to the unique phase relations between the incoming synchronizing pulses and the scanning signals encountered in the present system, as described and claimed in the copending application of Robert Adler, Serial No. 272,200, filed February 18, 1952, now Patent No. 2,781,468, issued February 12, 1957, for "Television Receiver," and assigned to the present assignee. Moreover, weak signal compensation may be provided in the manner described and claimed in the copending application of Robert Adler, Serial No. 304,698, filed August 16, 1952, for "Television Receiver," also assigned to the present assignee.

The system thus far described corresponds in its fundamental aspects to those disclosed in one or more of the above-identified copending applications. In the present invention, however, the system is modified to cut off the beam in the power section of electron-discharge device 23 during a major portion of each scanning cycle. To this end, a phase-shifting network comprising a condenser 95 and a resistor 96 is connected in parallel with parallel-resonant circuit 68, 75, and the junction 97 between condenser 95 and resistor 96 is coupled to focusing electrode 38 in the power section of device 23 by means of a coupling condenser 98, focusing electrode 38 being returned to ground through a high resistance 99. Focusing electrode 38 is also connected to AGC lead 93 through resistor 90.

The construction and operation of synchronizing and automatic gain control system 20 are generally similar to those disclosed and claimed in certain of the above-identified copending applications, and the operation will first be described in its more general aspects without regard to the beam-gating action of the present invention. Positive-polarity composite video signals, including the direct-voltage components, from the output circuit of first video amplifier 16 are applied to active deflector 37 by means of the voltage divider network comprising resistors 60 and 61 and condenser 62. Deflectors 36 and 37 are so biased that the beam projected through aperture 27 of accelerating electrode 28 is normally directed to an electron-impervious portion of target electrode 29, as for instance, to a solid portion of target electrode 29 on the side of apertures 30 and 31 nearer deflection plate 36, or to the left of aperture 30 in the view of Figure 3. Application of the positive-polarity composite video signals to active deflector 37 causes a transverse deflection of the beam in accordance with the instantaneous signal amplitude. The operating potentials for the various electrodes are so adjusted that different longitudinal portions of the beam are respectively deflected entirely into aperture 30 and partially into aperture 31 of intercepting anode 29 in response to the synchronizing-signal components of the applied composite video signals; the beam is entirely intercepted by target electrode 29 and/or deflection plate 36 during video-signal intervals. As a consequence, beam current is only permitted to flow to electrodes 33, 34 and 35 during synchronizing-pulse intervals.

The left-hand section of device 23 serves as a line-frequency oscillator in the line-frequency scanning system. Oppositely phased sinusoidal signals are applied to deflection electrodes 43 and 44 by means of coil 68 and condenser 75 which are tuned to the line-scanning frequency to operate as an oscillatory circuit or filter excited by means of coil 81 inserted in series with the line-frequency deflection coil 21. Consequently, the beam in the left-hand section of device 23 is caused to sweep back and forth between anodes 40 and 41, so that a rectangular-wave output voltage is developed across resistor 84. This output voltage is differentiated by means of condenser 85 and resistor 86, and the resulting positive-polarity or negative-polarity pulses are employed to trigger line-frequency sweep system 67, depending on the construction of that sweep system.

At the same time, the same oppositely phased sinusoidal voltage waves applied to deflection electrodes 43 and 44 are impressed on controllector electrodes 33 and 34, respectively in the right-hand section of device 23. As previously explained, current flow to controllector electrodes 33 and 34 is restricted to synchronizing-pulse intervals by virtue of the geometry of target electrode 29. The current distribution between electrodes 33 and 34 is dependent upon the instantaneous potential difference between these electrodes during the synchronizing-pulse intervals.

The oppositely phased sinusoidal signals developed at the terminals of coil 68 by excitation of tuned circuit 68, 75 in response to the sweep current through coil 81 serve as comparison signals in a balanced phase-detector. If the comparison signals are properly phased with respect to the incoming line-frequency synchronizing-signal pulses, the instantaneous potentials of controllector electrodes 33 and 34 are equal at the time of arrival of each synchronizing pulse, and the space current passing through aperture 30 is equally divided between electrodes 33 and 34, with the result that no unidirectional control potential difference is developed between the controllector electrodes. On the other hand, if the comparison signals and the incoming line-frequency synchronizing-signal pulses are not in proper phase synchronism, the instantaneous potentials of the two controllector electrodes 33 and 34 at the time of arrival of each line-frequency synchronizing-signal pulse are different, so that the beam currents collected by electrodes 33 and 34 are unequal and a balanced unidirectional control voltage is developed between the controllector electrodes. Since controllector electrodes 33 and 34 are directly connected to deflection electrodes 43 and 44 respectively in the left-hand section of device 23, the beam in the left-hand section is accelerated or retarded in its progress from anode 40 to anode 41 and back in response to the unidirectional control voltage. As a result, the positive and negative half-cycles of the output voltage wave developed across resistor 84 are altered in time duration with respect to each other in accordance with the unidirectional control potential difference between electrodes 33 and 34. The quasi-square wave thus developed is differentiated to provide triggering pulses for line-frequency sweep system 67. Since the triggering pulses are derived by differentiating the leading or trailing edges of the output quasi-square wave, and since the timing of these leading and trailing edges is varied in accordance with the developed AFC potential, phase synchronism of the line-frequency sweep system with the incoming line-synchronizing pulses is assured.

In order to obtain the desired automatic-frequency-control action, it is essential that a condition in which the comparison signals lag the incoming synchronizing-signal pulses result in an increase in the frequency of the local oscillator comprising the left-hand section of device 23, line-frequency sweep system 67, and feedback circuit 81, 68. This operation is insured by the common direct connections for both the sinusoidal comparison signals and the unidirectional AFC potential from controllector electrodes 33 and 34 to deflection electrodes 43 and 44 respectively. It is possible, for a given construction of sweep system 67, that the system may fail to oscillate altogether due to incorrect phasing of the comparison signals and the triggering pulses for the line-frequency sweep system; this condition may be corrected by merely reversing the terminal connections of feedback coil 81 or of coil 68. Proper pull-in action is automatically insured for any condition for which oscillation is obtained.

To obtain field-frequency synchronization, the output currents to controllector electrodes 33 and 34 are effectively combined by means of resistor 70 connected in the common ground return for controllector electrodes 33 and 34. The combined output appearing across resistor 70 is integrated by integrator 82 to provide a control signal for field-frequency scanning system 83. The beam current through aperture 30, representing the clipped sync pulses, is first used in its entirety to provide a balanced line-frequency control potential, and then again in its entirety to synchronize the field scansion. The use of an output load impedance connected in a common return circuit for the phase-detector electrodes for deriving field-frequency driving pulses is specifically described and claimed in the copending application of Robert Adler, Serial No. 260,221, filed December 6, 1951, now Patent No. 2,740,002, issued March 27, 1956, entitled "Balance Sync Separator and Phase Comparator System," and assigned to the present assignee. It is also possible to employ a separate plate electrode for the sole purpose of developing field-frequency synchronizing-signal pulses for application to the field-frequency scanning system, as described in Spracklen application Serial No. 246,768.

Plate electrode 35 develops a unidirectional control potential indicative of the peak amplitude of the composite video signals for application to the receiving circuits preceding the video detector to effect automatic gain control of the receiver. Plate electrode 35 is conditioned to receive substantially all beam current directed thereto by virtue of its connection to B+ through resistor 87 and rheostat 88. During video-signal intervals, however, the input signal amplitude at active deflector 37 is not sufficient to cause deflection of space electrons through slot 31, with the result that space current is only permitted to flow to plate electrode 35 during synchronizing-pulse intervals. Noise pulses occurring during either synchronizing-pulse intervals or video-signal intervals are generally of much greater amplitude than the peak amplitude of the synchronizing pulses and thus cause deflection of the beam beyond slot 31. This results in an aperture-gating characteristic, as distinguished from the now-familiar time-gated automatic gain control system, with the automatic-gain-control potential being dependent substantially only on the peak amplitude of the synchronizing pulses. Series-connected resistors 87, 88, 89 and 90 constitute a voltage divider between B+ and focusing electrode 38 and are so proportioned that, in the absence of space current to plate electrode 35, the potential of AGC lead 93 is at or near ground, depending upon the required bias voltage for receiving circuits 11, 12 and 13. The potential of junction 92 varies in accordance with the space current to plate electrode 35 and is then filtered by condenser 94 and applied to AGC lead 93 to effect automatic gain control of the receiver. In other words, plate electrode 35 is coupled to an intermediate point on the voltage divider comprising resistors 87, 88, 89 and 90 to cause the potential at another intermediate point 92 to vary in response to variations in the peak amplitude of the synchronizing pulses applied to active deflector 37 from first video amplifier 16.

Figure 3:
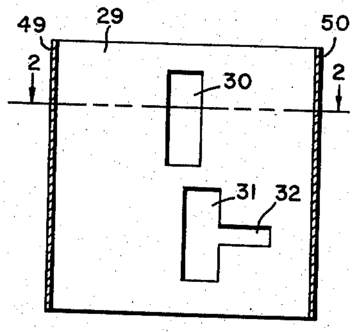
Figure 3 is a cross-sectional view taken along the line 3—3 of Figure 2.

Certain important advantages of the system may best be understood from a consideration of Figures 2–4. Since aperture 30 in intercepting anode 29 has definite fixed boundaries, it is apparent that deflection of the beam beyond aperture 30 results in interception thereof by anode 29. Consequently, extraneous noise pulses, which are generally of much larger amplitude than any desired component of the composite video signals, are not translated to controllector electrodes 33 and 34, and loss of synchronization due to extraneous impulse noise is substantially precluded. This operation is apparent from operating characteristic 51 of Figure 4. When composite video signals comprising synchronizing-pulse components 100 and video-signal components 101 are impressed on active deflector 37, extraneous noise pulses 102, 103 which are of greater peak amplitude than the synchronizing-pulse components by an amount exceeding the voltage represented by the spacing between vertical lines 104 and 105, result in deflection of the beam beyond aperture 30; consequently, these noise pulses are not translated to the output circuits associated with controllector electrodes 33 and 34, and substantial noise immunity is achieved. Aperture 30 is preferably of constant length in a direction parallel to cathode 25, in order to provide output current pulses of constant amplitude for application to scanning system 83 and to insure proper AFC action in spite of such rapid fluctuations in the amplitude of the synchronizing pulses as are occasionally encountered.

The operation of the automatic gain control system may perhaps best be understood by a consideration of operating characteristic 52 of Figure 4. Space electrons are permitted to pass to plate electrode 35 only when the electron beam is laterally deflected at least partially into aperture 31. In an equilibrium condition, the deflection-control system is so biased that the peaks of the synchronizing-signal pulses are impressed on the rising portion of characteristic 52, as indicated by vertical line 104. When the signal amplitude increases, the peaks of the synchronizing pulses 100 instantaneously extend further to the right, and the space current to plate electrode 35 is increased. This results in an increase in the negative unidirectional control potential applied to the receiving circuits 11, 12 and 13, thus reducing the gain of these circuits and thereby restoring the amplitude of the input signal applied to active deflector 37 to the equilibrium value indicated in the drawing. On the other hand, if the signal amplitude instantaneously decreases, the negative gain-control potential decreases and the gain of the receiving circuits is increased to restore equilibrium. Noise pulses 102 of sufficient amplitude to swing the beam beyond slot extension 32 are prevented from contributing materially to the automatic gain control potential by virtue of the finite boundaries of aperture 31. Noise pulses of lesser amplitude than pulse 102, such as pulse 103, contribute only very slightly to the automatic gain control potential by virtue of the restricted access to plate electrode 35 afforded by slot extension 32. Consequently, the aperture gating characteristic 52 of the AGC system provides substantial noise immunity which in practice has been found favorably comparable with that obtained by the use of conventional time-gated automatic gain control systems. Extension 32 of slot 31 is provided for the purpose of avoiding paralysis of the AGC system, as described in application Serial No. 242,509.

Since it is desirable for the synchronizing current pulses developed at controllector electrodes 33 and 34 to be of constant amplitude, it is preferred that the peaks of the synchronizing-pulse components 100 be impressed on characteristic 51 at a constant-current region of that characteristic; in other words, the synchronizing-pulse components of the applied composite video signals should cause deflection of the upper portion of the beam entirely into aperture 30. At the same time, because of the automatic gain control action, the peaks of the synchronizing-pulse components 100 are normally superimposed on a sloping portion of characteristic 52; in other words, the synchronizing-pulse components of the applied composite video signals cause deflection of the lower portion of the beam only partially into aperture 31. By disposing apertures 30 and 31 in overlapping or staggered alignment in a direction parallel to cathode 25, as illustrated in Figure 3, it is insured that whenever the automatic gain control action establishes the equilibrium condition illustrated by the graphical representation of Figure 4, synchronizing current pulses of constant amplitude are developed at controllector electrodes 33 and 34; in other words, the clipping level of the synchronizing-signal separator is automatically adjusted in spite of varying signal strengths at the receiver input. The direct voltage-to-alternating voltage transmission ratio of the voltage-divider network comprising resistors 60 and 61 and condenser 62 may be adjusted to a value of less than unity to preclude receiver paralysis under certain abnormal operating conditions, in the manner described and claimed in the copending application of John G. Spracklen, Serial No. 259,063, filed November 30, 1951, now Patent No. 2,684,403, issued July 20, 1954, for "Television Receiver" and assigned to the present assignee.

While the operation of the system is exceedingly stable and reliable, as compared to presently known systems, certain unique problems have been encountered owing to the specific construction of the tube and its circuit connections. Application of the comparison signals from tuned circuit 68, 75 to the deflectors 43 and 44 in the power section of the tube results in a periodic lateral deflection of the beam in the power section of the tube. It has been found that deflectors 43 and 44, even when constructed as simple parallel rods or wires, may draw beam current at the peak lateral excursions of the beam. By virtue of the direct connections between deflectors 43 and 44 and phase detector anodes 33 and 34 respectively, any beam current drawn by deflectors 43 and 44 results in a drop in the average voltage of phase detector anodes 33 and 34, an effect which is indistinguishable from the flow of excessive beam current through sync clipping slot 30 in the control section of the tube and which may lead to instability or collapse of the automatic frequency control system.

This collapse condition is avoided by cutting off the beam in the power section of the tube except at times when the line-synchronizing pulses are expected. Specifically, a gating signal in substantial phase quadrature with the AFC comparison signal is applied to focusing electrode 38, which serves as an intensity-control electrode in a manner analogous to the control grid of a cathode-ray picture tube. In this manner, the beam in the power section is cut off during intervals of peak amplitude of the comparison signal applied to deflectors 43 and 44, so that no beam current may be intercepted by these deflectors. At the same time, the gating of the beam in the power section has a further salutary effect in reducing the amount of current drawn by the power section of the tube.

Figure 6:
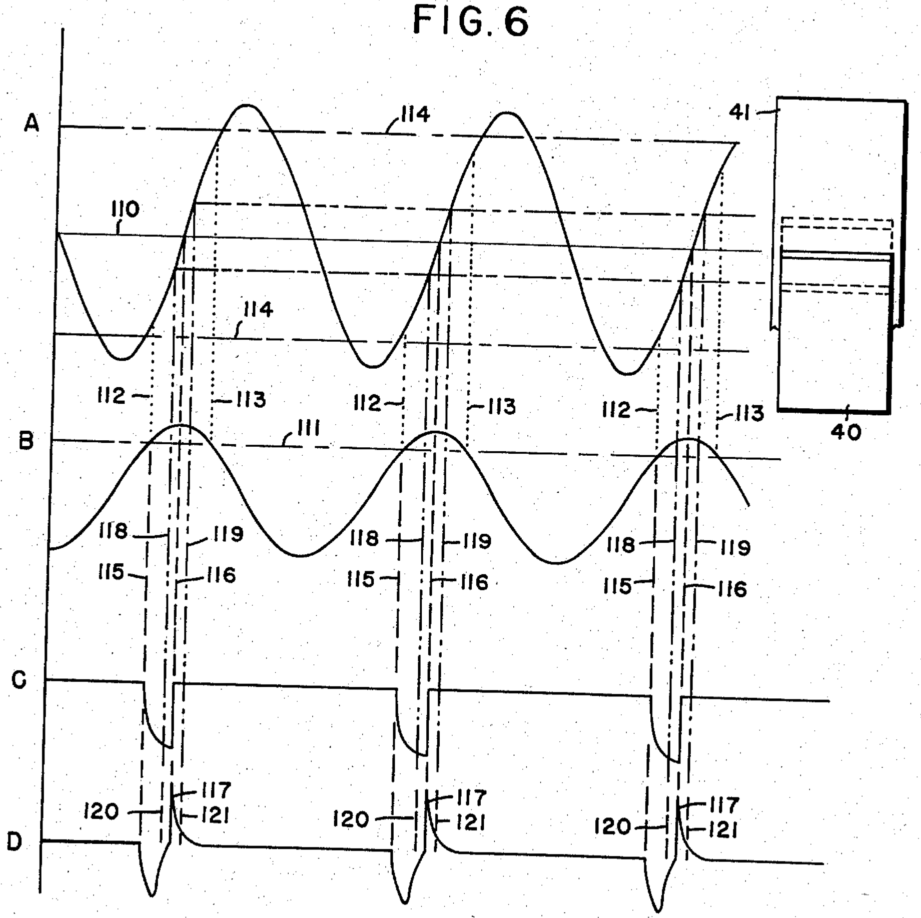

This aspect of the invention, described and claimed in applicant's copending application entitled "Television Receiver," filed December 16, 1957, Serial No. 702,836, and assigned to the assignee of this application, may perhaps be more readily understood by reference to the graphical representation of Figure 6 in which several waveforms are plotted as functions of time. Curve A represents the comparison signal applied between deflectors 43 and 44 of the power section and, for a condition of exact phase synchronism between the incoming line-synchronizing pulses and the comparison signal, is centered about an axis 110 corresponding to the intercepting edge of output anode 40.

Comparison signal A is also applied across the phase-shifting network comprising series-connected condenser 95 and resistor 96, and the voltage appearing across resistor 96, represented by curve B, is in substantial phase quadrature with comparison signal A, leading the latter by 90 electrical degrees. Gating signal B is applied to focusing electrode 38 in the power section of the tube by means of coupling condenser 98 and resistor 99 which serve as a self-biasing input circuit to establish the gating signal B at an appropriate level with respect to the cut-off voltage, represented by dot-dash line 111, of focusing electrode 38. Application of gating signal B to focusing electrode 38 permits the generation of an electron beam in the power section only during intervals when the focusing electrode potential exceeds its cutoff level 111, represented by the intervals between vertical dotted lines 112 and 113. If the horizontal dot-dash lines 114 in curve A of Figure 6 represent the threshold potentials of deflectors 43 and 44 beyond which they commence to draw beam current, it is apparent that the application of the gating signal B to focusing electrode 38 prevents the interception of beam current by deflectors 43 and 44 by cutting off the beam during those intervals when the comparison signal exceeds the threshold values 114.

The voltage developed at output anode 40 is represented by curve C of Figure 6. When the beam in the power section is first turned on, as the gating signal B exceeds the cutoff level 111 of focusing electrode 38 at the time represented by the vertical dash line 115, output anode 40 begins to draw beam current. Consequently, the potential of output anode 40 drops until the time represented by vertical dash line 116 when the potentials of deflectors 43 and 44 are equal. At that instant, the beam sweeps beyond the intercepting edge of output anode 40 and is thereafter directed to collector anode 41. Consequently, the potential of output anode 40 rises rapidly to its nominal or steady state value as the beam sweeps from anode 40 to anode 41. The voltage C developed by output anode 40 and appearing across load resistor 84 is differentiated by means of condenser 85 and resistor 86 to provide a differentiated signal of the waveform indicated in curve D of Figure 6, and the positive-polarity pulse components 117 of the differentiated output signal D are employed to trigger the discharge tube of line-frequency sweep system 67.

Any phase deviation of the comparison signal with respect to the incoming line-synchronizing pulses results in the generation of an automatic-frequency-control voltage between phase detector anodes 33 and 34, as explained above. This AFC voltage is applied to deflectors 43 and 44 by virtue of the same direct connections through which the comparison signal is supplied. Superposition of the unidirectional AFC voltage on the alternating comparison voltage results in an effective shift of its AC axis with respect to the intercepting edge of output anode 40. In Figure 6, the conditions of maximum phase deviation in either direction from synchronism have been indicated by showing an effective displacement of the intercepting edge of output anode 40 by an amount corresponding to the largest magnitude of the AFC voltage; however, it should be clearly understood that the position of the intercepting edge is a fixed element of tube construction, and the effective displacement illustrated in Figure 6 is shown only for the purpose of avoiding undue complication of the drawing. At a condition of maximum phase deviation in one direction, the crossover of the beam in the power section from the active anode 40 to the collector anode 41 occurs at an instant represented by dot-dash line 118, earlier than the time of crossover 116 when the system is operating in correct phase. On the other hand, under a condition of maximum phase deviation in the opposite direction, the beam crossover occurs at a time 119 which is later than the normal crossover time 116. As a result, the trailing edge of the output voltage pulses of curve C is shifted accordingly, and the position of the trigger pulses 117 of the differentiated output voltage wave D is advanced or delayed as indicated by the dashed lines 120 and 121 in accordance with the magnitude and direction of unbalance of the AFC voltage.

From the foregoing description, it is apparent that the waveform of the gating signal is not critical to the operation of the present invention; in the embodiment of Figure 1, a sinusoidal gating signal in phase quadrature with the comparison signal is employed for this purpose, but equivalent results may be obtained by employing pulse-type gating signals, derived either from the comparison signal or directly from the sweep output, in the proper phase with respect to the alternating voltage applied to the deflectors in the power section of the tube. Thus, for example, positive-polarity flyback pulses may be derived from a tap on the primary winding or from a separate secondary winding of the line-frequency sweep transformer and applied, after integration, to focusing electrode 38 to provide the desired gating action.

In accordance with the invention, the focusing electrode is also employed as a rectifying diode plate to produce a unidirectional negative bias potential which is superimposed on the automatic-gain-control voltage to provide a modified AGC voltage for application to the receiving circuits. In order for the focusing electrode to function in this manner, it is essential that at least a portion of the focusing electrode be directly exposed to the emissive surface of the cathode; for this reason, it is preferred to employ a focusing electrode which is electron-impervious except for a slot centered with respect to and narrower than the emissive surface of the cathode. Application of the gating signal to the focusing electrode through coupling condenser 98 produces a charge across the coupling condenser during the conductive portions of each operating cycle, and this negative voltage is smoothed by resistor 90 and condenser 94 and combined with the AGC voltage appearing at AGC plate 35 to provide a modified AGC signal having the proper average magnitude for application to the control grids of the receiving stages. The use of the focusing electrode as a diode plate, in addition to its functions as a focusing electrode and as a beam-gating electrode, results in the elimination of a battery or a separate diode for the development of the required negative bias potential for the AGC system.

While the invention is of particular utility in connection with a synchronizing system employing a special purpose electron-discharge device of the type described, entirely equivalent performance may be obtained with separate electron-discharge devices corresponding to the control section and the power section of device 23 respectively. Moreover, the invention may also be employed to advantage in receivers provided with other types of automatic frequency control and automatic gain control systems operating in conjunction with a beam deflection power tube constructed in the manner of the left-hand section of the device of Figure 2. For example, the automatic frequency control system may comprise a completely conventional double-diode balanced phase detector, and the automatic gain control system may be of a conventional type employing an amplitude-delay biased diode or triode rectifier which may be time gated if desired. Moreover, the negative bias voltage developed at the gating electrode may be applied to any direct-voltage utilization circuit requiring a negative energizing potential. Finally, it is not essential that the gating signal be applied to a focusing electrode; any electrode exerting an intensity-control influence on the electron beam of the power tube, either in the form of a slotted plate or a mesh grid, may be employed for this purpose, although it is preferred that the gating electrode be disposed closely adjacent the cathode emissive surface in embodiments in which it is desired to employ the gating electrode in the generation of a negative bias potential.

While a particular embodiment of the present invention has been shown and described, it is apparent that various changes and modifications may be made, and it is therefore contemplated in the appended claims to cover al such changes and modifications as fall within the true spirit and scope of the invention.

I claim:

1. In combination: an electron-discharge device comprising an electron gun including a cathode, an intensity-control electrode, and an accelerating electrode for projecting an electron beam, a deflection-control system, and an output electrode system; means for impressing an alternating voltage of predetermined periodicity on said deflection-control system; means for applying to said intensity-control electrode a periodic gating signal for interrupting the flow of space current to said output electrode system during at least a portion of each operating cycle of said alternating voltage; an alternating-voltage utilization circuit coupled to said output electrode system; a direct-voltage load circuit coupled to said intensity-control electrode and responsive to said gating signal for developing a direct-voltage signal; and a direct-voltage utilization circuit coupled to said load circuit.

2. In combination: an electron-discharge device comprising an electron gun including a cathode, a focusing electrode, and an accelerating electrode for projecting an electron beam, a deflection-control system, and an output electrode system; means for impressing an alternating voltage of predetermined periodicity on said deflection-control system; means including a self-biasing input circuit coupled to said focusing electrode for applying thereto a periodic gating signal for interrupting the flow of space current to said output electrode system during at least a portion of each operating cycle of said alternating voltage; an alternating-voltage utilization circuit coupled to said output electrode system; a direct-voltage load circuit coupled to said focusing electrode and responsive to said gating signal for developing a direct-voltage signal; and a direct-voltage utilization circuit coupled to said load circuit.

References Cited in the file of this patent

UNITED STATES PATENTS

| | | |
|---|---|---|
| 2,157,534 | George et al. | May 9, 1939 |
| 2,211,860 | Plaistowe | Aug. 20, 1940 |
| 2,565,486 | Feinstein et al. | Aug. 28, 1951 |
| 2,576,093 | Arditi | Nov. 27, 1951 |
| 2,649,542 | Glass | Aug. 18, 1953 |
| 2,684,404 | Adler | July 20, 1954 |